Aug. 2, 1966
S. W. ALDERFER
3,264,067
APPARATUS FOR CONTROLLING THE CHARGING
OF MOLDS WITH URETHANE FOAM
Filed Nov. 20, 1962
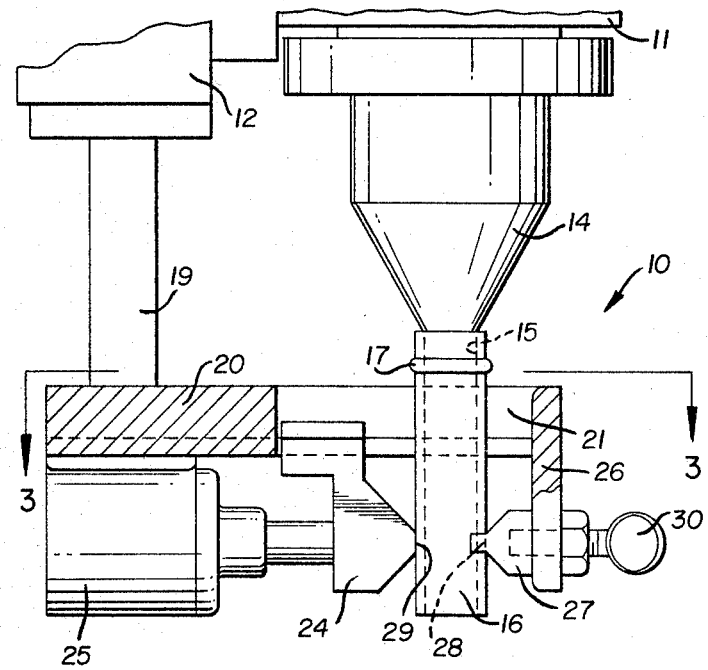
FIG. I
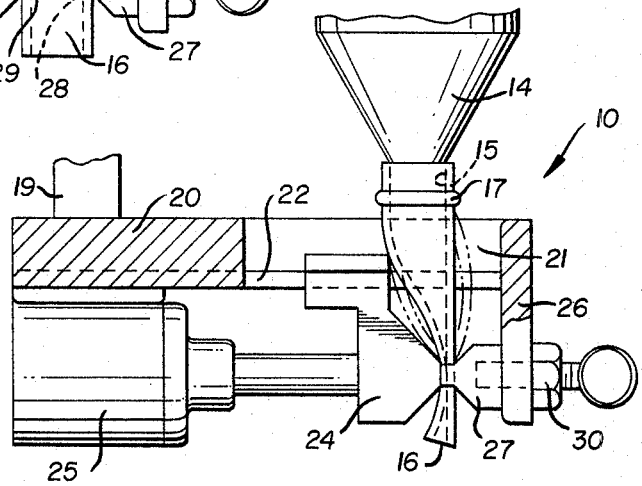
FIG. 2
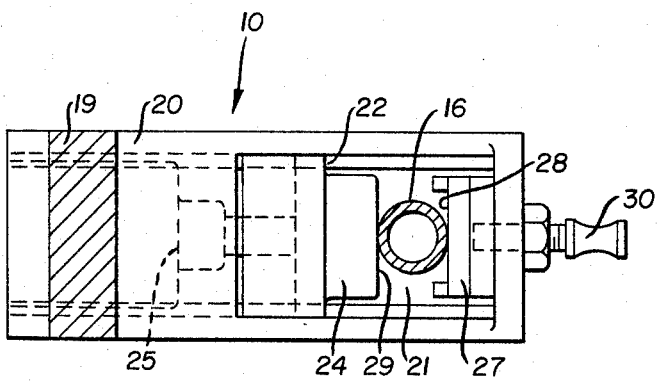
FIG. 3
INVENTOR.
STERLING W. ALDERFER
BY *Hamilton D Cook*
ATTORNEYS

3,264,067
APPARATUS FOR CONTROLLING THE CHARGING OF MOLDS WITH URETHANE FOAM
Sterling W. Alderfer, 464 N. Portage Path, Akron, Ohio
Filed Nov. 20, 1962, Ser. No. 238,965
1 Claim. (Cl. 23—252)

The present invention relates generally to the utilization of chemical foams for the manufacture of products or articles. More particularly, the invention relates to urethane foams formed by the reaction of an isocyanate group with the hydrogen of an hydroxyl group, whereby the reactants join through the formation of urethane linkage. Specifically, the invention relates to valve apparatus for controlling the charging of, or dispensing into, molds of the so-called "one-shot" urethane foams.

According to the one-shot techniques or system for producing a urethane foam, the isocyanate, polyester or polyether resin, catalyst and other additives are mixed directly and a foam is produced immediately. This system is preferred, particularly for the molding of smaller size products or articles, to the so-called "pre-polymer system" wherein the isocyanate and resin are mixed anhydrously and foaming is accomplished at some future time at a different location by the addition of the catalyst. Thus, the one-shot system for producing foam requires simpler processing equipment and less external heat (the foaming reaction is exothermic and develops internal heat), although, at the same time, the problems of controlling the conditions of one-shot foaming are critical with successful molding depending on a correct balance of numerous mechanical and chemical factors.

Assuming that the chemical reactants are correctly and appropriately chosen according to the physical properties desired for the foam product, the design of the mixing head is important. The reactants must be combined in correct proportions with high-shear mixing to ensure a complete reaction. However, because of the high-shear mixing, the foaming mass issues from the head with considerable swirling and momentum. In order to obtain a good product, it is desirable to eliminate splashing and swirling and to deposit the foaming mass as gently as possible in the mold. In the past, this result has been obtained by the use of small cross baffles and screen discs at the outlet end of the mixing chamber.

The object of the present invention is to provide improved valve apparatus for use in combination with the foam mixing head which will reduce and eliminate splashing and swirling of the foamed mass permitting a gentle deposit in a mold. It is a further object to provide a valve apparatus in forms which are of simple construction yet highly effective, and which will not defeat the self-cleaning features of the mixing head as tends to occur when baffles and screens are used. These and other objects of the invention, as well as the advantages thereof, will be readily apparent in view of the detailed disclosure and the drawing.

In the drawing:

FIG. 1 is a fragmentary view showing a valve apparatus according to the invention in an "open" position for charging of a foam mass from a mixing head;

FIG. 2 is a view similar to FIG. 1 but showing the valve in the closed position; and FIG. 3 is a plan view, taken substantially as indicated on line 3—3 of FIG. 1, showing details of the valve apparatus.

The improved valve construction according to the invention, indicated generally by the numeral 10, is used in combination with a head 11 for mixing of the foam reactants. The head 11 is mounted on a frame 12 projecting above and over the molds and any mold conveying equipment being used.

On the underside of the head 11 is a conically tapered outlet or foam discharge cone 14 terminating in a spout or nozzle 15. A flexible, radially expandable, resilient elongate hollow tube 16 is securely attached, as by a spring clip 17, to the cone spout 15.

The tube 16 is the conduit element or axial component of the intermittently and selectively operating valve construction 10 for controlling the deposition of predetermined amounts of the foamed mass from the mixing head 11 into the molds. The tube 16 is constructed of a rubber, rubber-like or plastic material which is radially expandable and which has resiliency and recovery characteristics after periods of radial deformation.

Extending below the frame 12 supporting the mixing head 11 is a vertical hanger bracket 19, carrying a horizontal valve block 20. The valve block 20 surrounds the tube 16 intermediate its ends, is generally rectangular (see FIG. 3), and has an opening 21 permitting extension of the tube 16 therethrough. Adjacent the block opening 21 is an elongate slot 22 carrying or mounting a pinch clamp 24 for movement toward and away from a mid portion of the tube 16. The pinch clamp 24 is secured to the reciprocating element of a suitable actuating means 25, such as a push-pull electrically operated solenoid mounted on the under surface of the valve block 20.

On the side of the block opening 21 opposite the pinch clamp 24, is a depending bracket 26 carrying a fixed pinch stop 27 having a surface 28 opposed to the working surface 29 of the pinch clamp 24. The pinch stop 27 is movable as by a bolt and nut 30 to adjust and regulate the distance between the pinch surfaces 28 and 29.

The mixing head 11 is supplied with the various reactants by pumps (not shown). It is an advantage of this invention that the mixing head and the supply pumps can be operated continuously at rates or capacities or under conditions determined solely by chemical factors of reactant composition and mechanical factors to accomplish high shear mixing. The valve apparatus 10 permits the head 11 and pumps to operate in such an independent and technically advantageous manner, with precise control of mold charging, for operations in which the "shut-off" period is short, for example, three to seven or eight seconds between molds.

In FIG. 1, the valve 10 is open and the foamed mass will flow from the mixer head 11 and through the cone 14 and spout 15 and the conduit of tube 16 into a waiting mold. In FIG. 2, the actuating means 25 has moved the pinch clamp 24 toward the pinch stop 27 a distance sufficient to close the valve 10 by shutting off the conduit of tube 16 which is compressed between surfaces 28 and 29. During the pre-determined closed or shut-off period, the foamed mass from the mixer head 11 is forced into the compressively closed tube 16 and expands there radially expanding or distending the walls of the flexible tube (see the chain lines in FIG. 2). When the next mold comes into place, which determines the extent of the shut-off period, the actuating means 25 opens the valve 10 by moving the clamp 24 away from the stop 27, and the charge that has accumulated in the expanded tube 16 from the continuously operating mixing head 11 flows smoothly out into the mold. The sudden release of the accumulated foamed mass will also assist the self-cleaning features of the mixing head and purge the interior of the tube 16.

From the above description it will now be understood that valve apparatus 10 according to the following claim makes an important contribution to the art of using one-shot urethane foams in the commercial manufacture of products or articles.

What is claimed is:

In apparatus for controlling the charging of molds with one-shot urethane foams, said apparatus having a frame means, high-shear mixing head means mounted on said frame means for continuously combining reactants and producing a urethane foam, discharge cone means positioned below and having its inlet end communicating with said high-shear mixing head means;

valve means selectively controlling the charging of molds with urethane foam from said discharge cone means, said valve means comprising;

block means carried by said frame means and having an opening therethrough, an elongate radially expansible resilient hollow tube connected to the outlet end of said discharge cone means and extending through the opening in said block means toward the molds, said tube having recovery characteristics after periods of radial deformation by expansion of said urethane foam therein during shut-off of said valve means, pinch stop means attached to said block means on one side of said opening and having a flat rectangular surface, pinch clamp means movably mounted on said block means in opposing relation to said pinch stop means and having a flat rectangular surface adapted to engage the said flat rectangular surface of said pinch stop means, and actuating means to selectively move said pinch clamp means toward said pinch stop means to compress said tube between said rectangular surfaces and close the conduit therethrough for predetermined shut-off periods thereby radially distending said tube under the influence of discharge pressure of said high-shear mixing head means and reaction pressure of the accumulated foamed mass of said continuously combining reactants therein above said clamp means whereby release of said pinch clamp means at the end of said shut-off period produces a sudden release of said accumulated foam mass and a pressure purge of said tube.

References Cited by the Examiner
UNITED STATES PATENTS

| | | | |
|---|---|---|---|
| 2,396,544 | 3/1946 | Voyle | 251—7 X |
| 2,578,918 | 12/1951 | Boddy et al. | 259—44 |
| 2,884,963 | 5/1959 | Erndt | 251—5 X |
| 2,900,109 | 8/1959 | Hoopes et al. | 222—181 X |
| 2,948,928 | 8/1960 | Ebneth et al. | 260—2.5 X |
| 2,955,726 | 10/1960 | Feldman | 251—7 X |
| 2,962,255 | 11/1960 | Samuels | 251—7 |
| 2,979,931 | 4/1961 | Hubbard | 251—7 X |
| 2,990,380 | 6/1961 | Averbach et al. | 260—2.5 X |
| 3,222,134 | 12/1965 | Peterson | 23—252 |

WILLIAM F. O'DEA, *Primary Examiner.*

ISADOR WEIL, *Examiner.*

R. GERARD, *Assistant Examiner.*